United States Patent
Parvataneni et al.

(10) Patent No.: US 12,132,616 B2
(45) Date of Patent: Oct. 29, 2024

(54) SYSTEMS AND METHODS FOR INTER-OPERATOR EDGE DISCOVERY USING DISTRIBUTED LEDGER SYSTEM

(71) Applicant: Verizon Patent and Licensing Inc., Basking Ridge, NJ (US)

(72) Inventors: Raghuram Parvataneni, Plano, TX (US); John Patrick Hickey, III, Metuchen, NJ (US); Syed Rehman, Monmouth Junction, NJ (US); Anil K. Guntupalli, Irving, TX (US); Mahesh Chapalamadugu, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 392 days.

(21) Appl. No.: 17/660,116

(22) Filed: Apr. 21, 2022

(65) Prior Publication Data

US 2023/0344719 A1    Oct. 26, 2023

(51) Int. Cl.
| | | |
|---|---|---|
| *H04W 28/04* | (2009.01) | |
| *H04L 41/12* | (2022.01) | |
| *H04W 28/02* | (2009.01) | |
| *H04W 40/24* | (2009.01) | |

(52) U.S. Cl.
CPC ......... *H04L 41/12* (2013.01); *H04W 28/0268* (2013.01); *H04W 40/246* (2013.01)

(58) Field of Classification Search
CPC .... H04W 28/24; G06F 16/27; H04L 41/5051; H04L 41/5096; H04L 41/085; H04L 41/28; H04L 41/12
See application file for complete search history.

(56) References Cited

U.S. PATENT DOCUMENTS

| | | | |
|---|---|---|---|
| 11,711,759 B1* | 7/2023 | Gupta | H04L 45/64 370/235 |
| 2020/0195495 A1* | 6/2020 | Parker | H04L 41/40 |
| 2021/0014132 A1* | 1/2021 | Smith | H04L 9/3239 |
| 2022/0038289 A1* | 2/2022 | Huang | G06F 16/27 |
| 2023/0074288 A1* | 3/2023 | Filippou | H04W 28/0236 |

\* cited by examiner

*Primary Examiner* — Lan-Huong Truong

(57) ABSTRACT

A system described herein may record, to a distributed ledger, information associating a particular application with a particular set of Quality of Service ("QoS") information. A particular Multi-Access/Mobile Edge Computing ("MEC") device operator system may access the distributed ledger to identify the information associating the particular application with the particular set of QoS information. The system may read, from the distributed ledger, MEC configuration information indicating that the MEC device operator system has configured one or more MEC devices, of a plurality of MEC devices to provide the particular application in accordance with the particular set of QoS information. The system may select a particular MEC device, from the plurality of MEC devices, based on a request and further based on the MEC configuration information, and may output an indication of the selected particular MEC device in response to the request.

20 Claims, 9 Drawing Sheets

SYSTEMS AND METHODS FOR INTER-OPERATOR EDGE DISCOVERY USING DISTRIBUTED LEDGER SYSTEM

BACKGROUND

Wireless networks may provide wireless connectivity to User Equipment ("UEs") such as mobile phones, tablets, Internet of Things ("IoT") devices, or other types of devices. Wireless networks may deploy edge computing systems at various geographical locations in order to provide lower latency service to UEs that are located in or near such geographical locations. Different wireless network operators may provide different sets of edge computing systems. Distributed ledgers, such as blockchains, provide for the decentralized and secure storage of data. Distributed ledgers may further provide for the immutability of recorded data, as data may not be altered once recorded to a distributed ledger.

DETAILED DESCRIPTION OF EXAMPLE EMBODIMENTS

Figure 1:
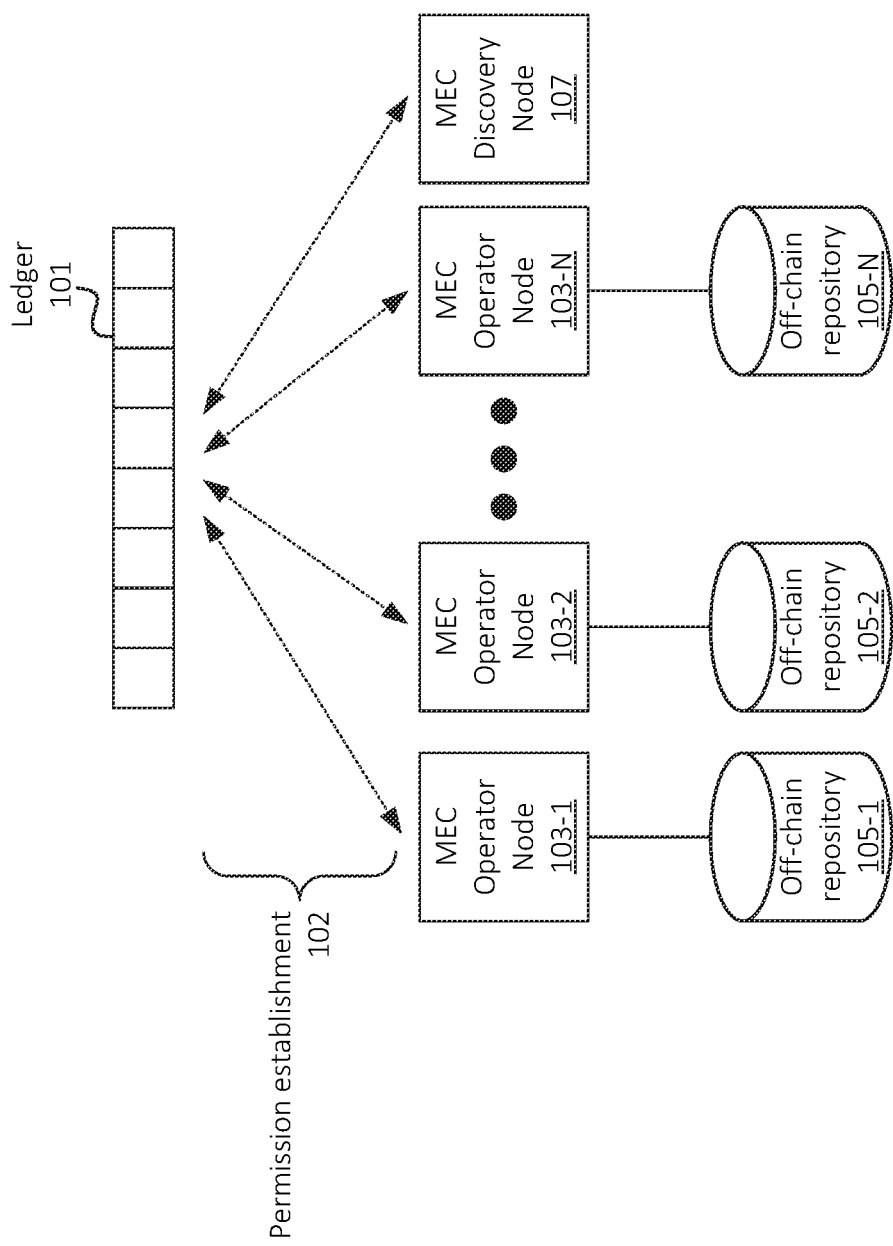
FIG. 1 illustrates an example permission establishment procedure associated with a distributed ledger, in accordance with some embodiments.

The following detailed description refers to the accompanying drawings. The same reference numbers in different drawings may identify the same or similar elements.

Embodiments described herein provide for the use of distributed ledgers, such as blockchains, to provide an edge discovery service in which a UE such as a mobile phone, a tablet, an IoT device, etc. may identify one or more edge devices via which the UE may receive service. Edge devices may include Multi-Access/Mobile Edge Computing ("MEC") devices, referred to sometimes herein simply as a "MECs," or other suitable devices or systems that are deployed in geographically distinct regions. MECs or other edge devices (referred to herein simply as "MECs" for the sake of brevity) may, for example, be co-located with base stations of a radio access network ("RAN") and/or may otherwise be communicatively coupled to a RAN. MECs may accordingly provide services, such as traffic processing services, gaming services, augmented reality services, autonomous driving assistance services, etc. to UEs without the need for traffic associated with such UEs to be provided to or from a wireless network core or some other external network.

Particular applications, that are associated with services provided via MECs, may be associated with different Service Level Agreements ("SLAs"), QoS thresholds, latency thresholds, or the like (referred to herein simply as "QoS information" for the sake of brevity). Further, different wireless network operators may maintain distinct sets of RANs, base stations, MECs, etc. Embodiments discussed herein may provide for multiple wireless network operators to receive QoS information associated with various applications in order to configure MECs to provide services associated with such applications in accordance with the QoS information (e.g., to deliver such services in accordance with QoS thresholds, latency thresholds, etc.). Further, embodiments discussed herein may provide for a UE to perform an edge discovery process in which MECs associated with multiple wireless network operators may be identified (e.g., based on a location of the UE), and a MEC may be selected to provide services to the UE. Such operations may, in some embodiments, be performed without explicit coordination between different wireless network operators, thus maintaining the security of each wireless network operator as well as reducing the complexity of inter-operator MEC selection (e.g., by not requiring inter-communication or coordination between such wireless network operators). For example, embodiments described herein may make use of one or more distributed ledgers, such as blockchains, in order to provide for the specifying of QoS information associated with one or more applications, the independent configuration of MECs associated with respective wireless network operators in order to provide services according to such QoS information, as well as the discovery by one or more UEs of MECs associated with different wireless network operators in order to receive optimal service associated with such applications.

As shown in FIG. 1, a set of nodes may establish (at 102) ledger 101, which may include one or more blockchains or other suitable types of distributed ledgers. Distributed ledgers, such as ledger 101, may provide for a decentralized, immutable mechanism by which data may be recorded and/or retrieved. Nodes, validators, or other participants (referred to herein simply as "nodes" for the sake of brevity) of such ledgers may participate in a consensus mechanism in which data recorded to ledger 101 is validated, approved, voted on, signed, etc. by multiple nodes prior to the recordation of such data to ledger 101. The nodes may also maintain a copy (e.g., a full copy) of ledger 101, and may update such copies of ledger 101 as data is recorded to ledger 101.

In some embodiments, ledger 101 may be associated with one or more trust or authentication mechanisms, in which nodes that access ledger 101 (e.g., read from ledger 101 or record data to ledger 101) are registered, verified, and/or otherwise authenticated prior to being able to access ledger 101. In some embodiments, ledger 101 may include a permissioned blockchain, in which certain nodes have certain permissions, such as read, write, or both. In this manner, nodes, clients, and/or other entities that do not have permissions to access ledger 101 may be unable to access ledger 101 (e.g., requests to read or write to ledger 101 may be denied by nodes that maintain ledger 101).

In some embodiments, particular records recorded to ledger 101 may be associated with particular sets of permissions. For example, a client or other authorized entity that provides data to be recorded to ledger 101 may specify one or more other entities, such as other nodes, clients, wallets, etc. that are authorized to access (e.g., read) such data. Such permissions may be specified by parameters, metadata, etc. of the data to be recorded to ledger 101. The permissions may indicate an address, group, category, label, or other suitable identifier of entities that are authorized to access the data. The specified address may be, for example, an address of a node, client, wallet, or other entity associated with ledger 101. In some embodiments, ledger 101 may include a mapping between such addresses and groups, categories, labels, etc. Additionally, or alternatively, a "hyper" ledger framework or other type of ledger management system or ledger framework associated with ledger 101 may maintain such mapping. In this manner, some nodes that are authorized to access ledger 101 may not be able to access particular data recorded to ledger 101, while other nodes that are authorized to access ledger 101 may be able to access the particular data.

In some embodiments, each node associated with ledger 101 may be associated with a set of keys, such as a private key and a public key. In the event that data, recorded to ledger 101, is to be accessed by a particular node, the data may be encrypted using the public key for that node, and may be decrypted by the particular node using the private key.

In FIG. 1, a set of nodes (i.e., MEC operator nodes 103, in this example) may participate (at 102) in a permission establishment procedure, in which MEC operator nodes 103-1 through 103-N are registered to access ledger 101. In some embodiments, as part of the permission establishment procedure two or more MEC operator nodes 103 may generate ledger 101, and/or may communicate with a "hyper" ledger or other ledger management system in order to generate ledger 101. MEC operator nodes 103 may be associated with a set of default permissions, such as permission to write data to ledger 101, and/or permission to read data recorded to ledger 101 (e.g., unless the data includes permissions that prohibit one or more nodes 103 from reading the data, as discussed above). In some embodiments, the permission establishment procedure may include the generation of one or more keys, such as a set of private keys associated with each MEC operator node 103, where the set of private keys may be used to "sign" messages or other interactions directed to ledger 101. In some embodiments, the one or more keys may include a public-private key pair, where the public key may be used to encrypt data recorded to ledger 101 and the private key may be used by MEC operator node 103 to decrypt such data, as discussed above.

MEC operator nodes 103 may each be associated with separate off-chain repositories 105. For example, MEC operator node 103-1 may maintain or may be communicatively coupled to off-chain repository 105-1, MEC operator node 103-2 may maintain or may be communicatively coupled to off-chain repository 105-2, and so on. Off-chain repositories 105 may, for example, be associated with authentication techniques via which respective MEC operator nodes 103 are able to access off-chain repositories 105 (e.g., off-chain repositories 105 are secure from entities that are not authorized to access off-chain repositories 105). In some embodiments, different off-chain repositories 105 may be maintained in separate storage systems, such as different datacenters, different cloud storage systems, etc. In some embodiments, the information stored in off-chain repositories 105 may be referenced by information stored in ledger 101. For example, ledger 101 may include an address, pointer, reference, identifier, hash, etc. that references data with a relatively larger size and/or that is private data (e.g., video content, audio content, MEC configuration parameters, etc.) maintained in a particular off-chain repository 105 associated with a particular MEC operator node 103.

In this manner, other than the coordinated maintenance of ledger 101, MEC operator nodes 103 may be associated with distinct entities which may maintain separate off-chain data. As discussed herein, such separately maintained off-chain data may include configuration information and/or other information associated with respective sets of MECs. MEC operator nodes 103 may be, for example, associated with different operators of different RANs and/or MECs. For example, MEC operator node 103-1 may be associated with a first MEC operator system that provides a first set of MECs (e.g., MECs that are co-located with and/or are otherwise communicatively coupled to a first RAN), MEC operator node 103-2 may be associated with a second MEC operator system that provides a second set of MECs (e.g., MECs that are co-located with and/or are otherwise communicatively coupled to a second RAN), and so on. In some embodiments, a respective off-chain repository 105, associated with a particular MEC operator node 103, may include MEC configuration parameters for one or more MECs provided or operated by an entity (e.g., a MEC provider, a RAN provider, a wireless network provider, etc.) associated with the particular MEC operator node 103.

Such MEC configuration parameters may include, for example, application installation packages or containers (e.g., particular applications to be executed by one or more MECs associated with a particular MEC operator system), MEC resource allocation parameters (e.g., an allocation of processing resources, memory resources, etc. of one or more MECs on a per-application basis, a per-UE basis, or some other suitable basis), MEC access parameters (e.g., an indication of particular UEs or UE groups that are authorized to access particular MECs), MEC load balancing parameters, and/or other suitable configuration parameters of MECs associated with the particular MEC operator system. In some embodiments, as discussed herein, such MEC configuration parameters may be determined or generated by MEC operator nodes 103 and/or by other suitable devices or systems based on various factors, models, etc. For example, a particular set of MEC configuration parameters (e.g., associated with a particular MEC operator system) may be based on an actual or predicted (e.g., as predicted using artificial intelligence/machine learning ("AI/ML") techniques or other suitable modeling techniques) demand for a particular application at a particular location. In some embodiments, a set of MEC configuration parameters may be based on QoS thresholds associated with a particular application (e.g., where such MEC configuration parameters are determined in order to meet the QoS thresholds associated with the particular application). In some embodiments, a set of MEC configuration parameters may be based on a location or service region associated with a particular MEC or set of MECs. In some embodiments, the MEC configuration parameters, associated with a particular MEC operator system, may be determined or specified in some other suitable manner.

As further shown, ledger 101 may be associated with MEC discovery node 107. In some embodiments, MEC discovery node 107 may be implemented by, may include, and/or may be communicatively coupled to a decentralized application ("dApp") or other type of entity that is authorized (e.g., via a permission establishment procedure at 102) to record data to ledger 101, read data from ledger 101, and/or perform other operations discussed herein.

Figure 2:
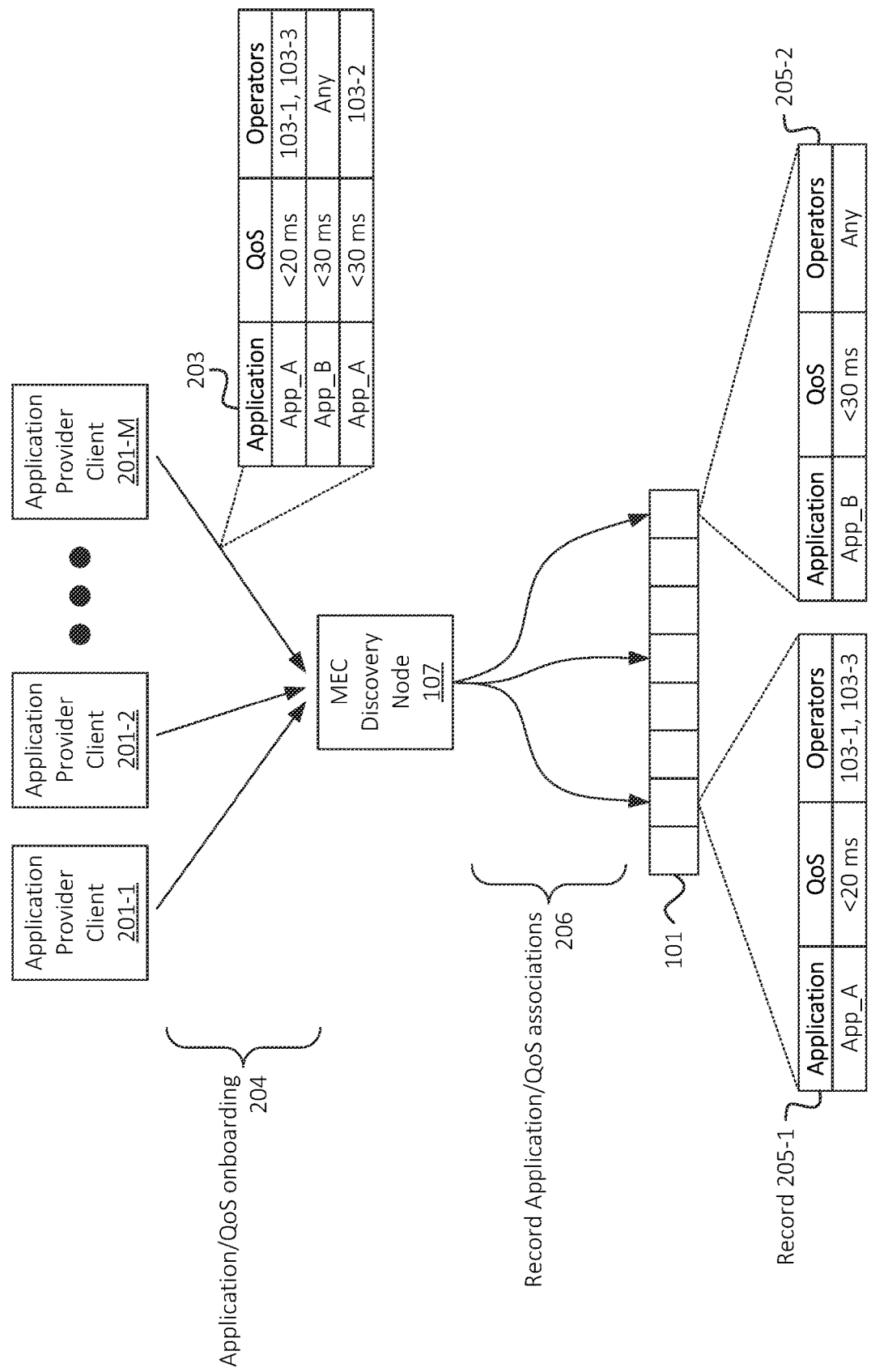
FIG. 2 illustrates an example of recording information associating applications with respective Quality of Service ("QoS") information to a distributed ledger, in accordance with some embodiments.

For example, as shown in FIG. 2, MEC discovery node 107 may serve as an interface between one or more application provider clients 201 and ledger 101 (e.g., with one or more MEC operator nodes 103 that implement, maintain, etc. ledger 101). Application provider clients 201 may be associated with one or more entities that provide one or more different applications that are, for example, executable or otherwise deployable at one or more MECs. In some embodiments, application provider clients 201 may not have access to read or write to ledger 101, thus preserving the security of ledger 101. Further, ledger 101 may be "invisible" to application providers and/or may otherwise be a "back end" or "black box" system with respect to application provider clients 201. On the other hand, in some embodiments, application provider clients 201 may be or may include entities with an address, set of keys, or other information associated with ledger 101, and may accordingly use such mechanisms to "sign" interactions with MEC discovery node 107.

Application provider clients 201 may, for example, provide (at 204) application and/or QoS onboarding information. Data structure 203 reflects an example of application and/or QoS onboarding information that may be provided by a particular application provider client 201 and/or by application provider clients 201. In some embodiments, data structure 203 may include an application service profile, where different applications may be associated with different QoS information. As shown, for example, data structure 203 may include QoS information for two example applications, "App_A" and "App_B." In some embodiments, the "Application" field of data structure 203 may include a name, identifier, or other indicator of a particular application, such as an application that is executable or deployable at one or more MECs. Such application may include a gaming application, an augmented reality application, a video processing application, or other MEC-deployable application. The "QoS" field may indicate one or more QoS thresholds, SLAs, minimum performance metrics, or other suitable QoS information. In the examples discussed herein, the QoS information is specified in terms of maximum latency. In practice, the QoS information may be specified in some other suitable manner (e.g., minimum throughput, maximum processing time, etc.). The "Operators" field may specify particular MEC operator systems, such as by a name or other identifier of such MEC operator systems. Additionally, or alternatively, the "Operators" field may include address, identifiers, etc. of MEC operator nodes 103 with which respective MEC operator systems are associated.

The "Operators" field may, in some embodiments, indicate MEC operator systems with which a given set of QoS information for a given application are associated. For example, App_A may be associated with a maximum latency of 20 milliseconds ("ms") for MECs provided by MEC operator systems associated with MEC operator nodes 103-1 and 103-3, and may be associated with a maximum latency of 30 ms for MECs provided by a MEC operator system associated with MEC operator node 103-2. The different QoS information for the same application but for different providers may be based on different agreements, metrics, criteria, or other factors between particular application providers and particular MEC providers. In some embodiments, a given application may be authorized to be installed on MECs associated with a first set of MEC providers, but may not be authorized to be installed on MECs associated with a second set of MEC providers. The application and/or QoS onboarding procedure (at 204) may accordingly reflect such authorizations of applications, as well as respective QoS information, for particular MEC providers.

While an example of data structure 203 is discussed herein, in practice, data structure 203 may include additional, fewer, or different information items. For example, in some embodiments, in lieu of an "Operators" field, portions of data structure 203 may be encrypted using a public key associated with a particular MEC operator system with which a given record is associated (e.g., the information indicating the 30 ms maximum latency for App_A may be encrypted using a public key associated with MEC operator node 103-2). In this manner, MEC operator systems with which respective application and/or QoS information is associated may be able to access such information, while MEC operator systems with which respective application and/or QoS information is not associated may be unable to access such information. Further, as discussed above, some portions of data structure 203 may be provided by one application provider client 201, while another portion of data structure 203 may be provided by another application provider client 201. Additionally, or alternatively, different application provider clients 201 may provide different instances of data structure 203.

MEC discovery node 107 may record (at 206) the associations of particular applications to QoS information and/or MEC providers (e.g., as reflected in example data structure 203) to ledger 101. For example, MEC discovery node 107 may interact with one or more smart contracts deployed to ledger 101 and/or may otherwise cause one or more records to be generated on ledger 101 with some or all of the data shown in data structure 203. For example, MEC discovery node 107 may cause records 205-1, 205-2, and/or other records to be written to ledger 101 based on the provided (at 204) information. Record 205-1, for example, may include the above-discussed indication that App_A is associated with a maximum latency of 20 ms when served by MEC operator systems associated with MEC operator nodes 103-1 and 103-3. Record 205-2 may include an indication that App_B is associated with a maximum latency of 30 ms when served by MECs associated with any operator. One or more other records 205 may include indications of QoS and/or operator information associated with other applications, including an indication that App_A is associated with a maximum latency of 30 ms when served by MEC operator systems associated with MEC operator node 103-2.

As discussed above, in embodiments where the application and/or QoS associations are encrypted (e.g., using a public key associated with a given MEC operator system), a given record 205 may not explicitly include an indication of a particular MEC operator system. In such embodiments, record 205-2 may be unencrypted, as the application and/or QoS association indicated therein is indicated as accessible by any MEC operator system that is authorized to access ledger 101.

Figure 3:
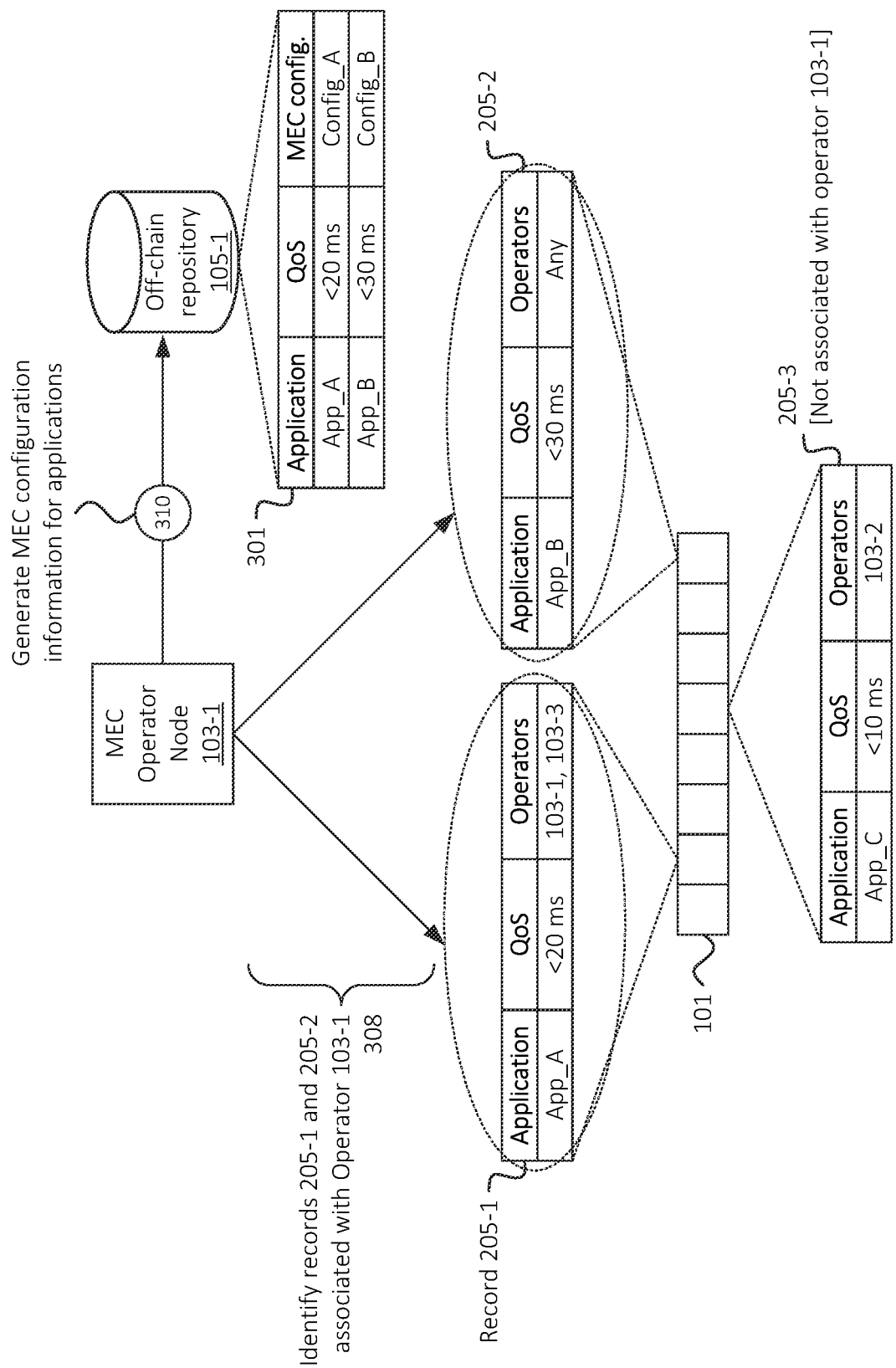
FIG. 3 illustrates an example of generating configuration information based on QoS information, associated with one or more applications, recorded to a distributed ledger, in accordance with some embodiments.

MEC operator nodes 103 may accordingly access ledger 101 in order to determine particular QoS information associated with particular applications, in the event that such applications are to be provided via MECs associated with corresponding MEC operator systems. For example, as shown in FIG. 3, MEC operator node 103-1, associated with a particular MEC operator system, may identify (at 308)

records 205-1 and 205-2, which include application and/or QoS information that is accessible to MEC operator node 103-1. For example, as discussed above, MEC operator node 103-1 may identify an identifier of MEC operator node 103-1 and/or a corresponding MEC operator system, as included in records 205-1 and 205-2. Additionally, or alternatively, MEC operator node 103-1 may use a private key to decrypt (or attempt to decrypt) one or more records of ledger 101, including record 205-1.

In this manner, while ledger 101 may maintain a record (e.g., record 205-3) associating App_A with a maximum latency of 30 ms for a MEC operator system associated with MEC operator node 103-2, such record may be inaccessible to MEC operator node 103-1. Additionally, or alternatively, MEC operator node 103-1 may be able to access such a record, but may determine that the record does not include information based on which MEC operator node 103-1 performs subsequent operations discussed herein, and may therefore "ignore" such record.

For example, MEC operator node 103-1 may generate (at 310) MEC configuration information, and may store such information in off-chain repository 105-1 (e.g., in data structure 301 and/or one or more other suitable data structures). As discussed above, the MEC configuration information may include, for example, MEC resource allocations and/or other suitable configuration parameters selected or determined by the corresponding MEC operator system based on the QoS information. In some embodiments, the MEC configuration information may include a listing of MECs that are capable of meeting QoS information (e.g., meeting QoS thresholds, SLAs, etc.). For example, such MEC configuration parameters may be selected in order to meet thresholds, metrics, etc. specified by the QoS information, such as maximum latency. In some embodiments, the MEC configuration information may include or may be based on models such as AI/ML models, which may include different MEC configuration parameters for different situations. Such different situations may include, for example, an increased actual or predicted demand for a given application at a given MEC or set of MECs (e.g., at a particular location or region), the amount of available resources at a given MEC or set of MECs (e.g., different resource allocation parameters may be specified when a MEC has relatively fewer available resources than when the MEC has more resources available), and/or other types of situations or conditions. Such MEC configuration information, including conditional MEC configuration parameters as discussed above, is denoted in the figures as "Config_A" and "Config_B."

Figure 4:
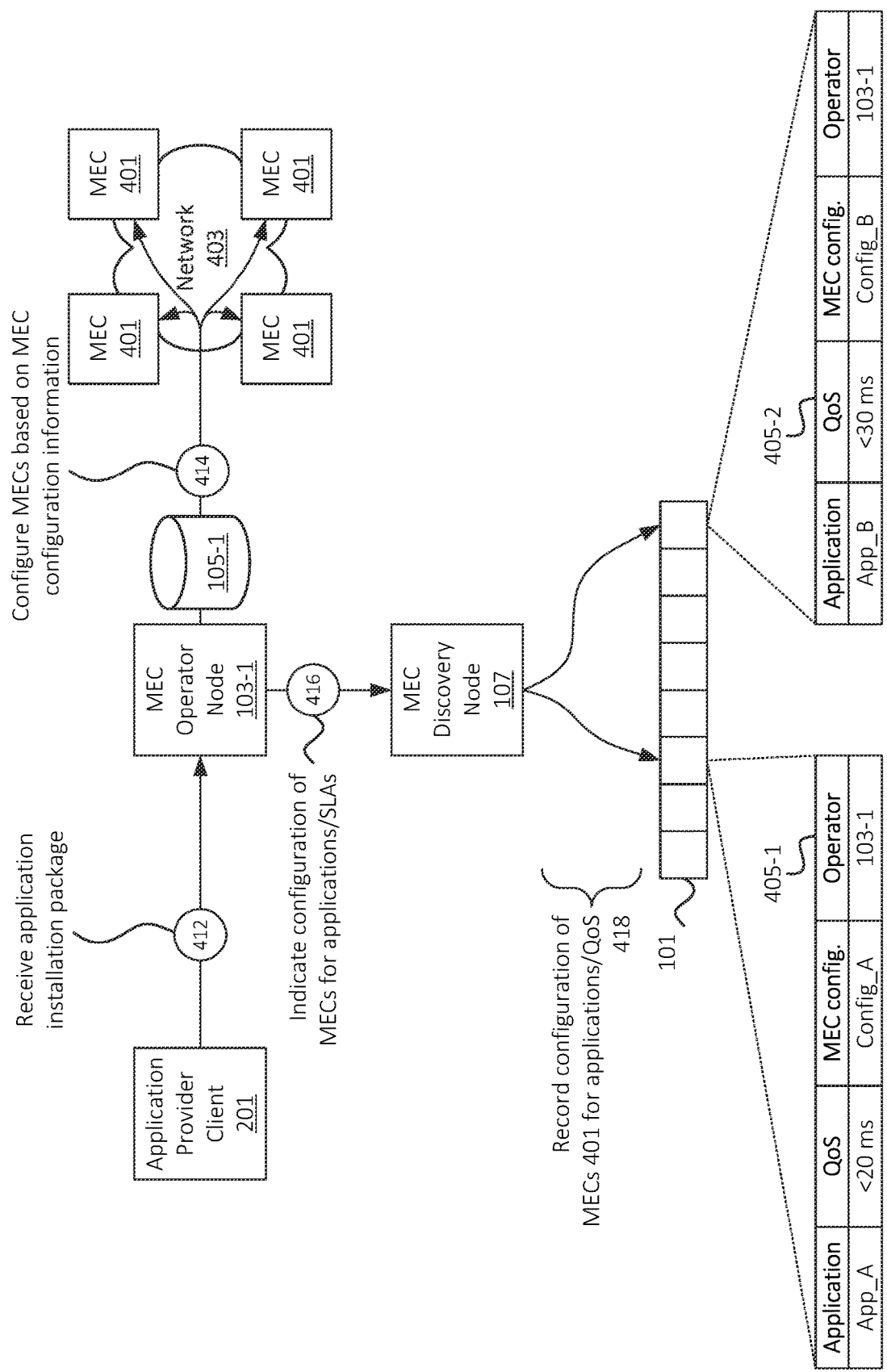
FIG. 4 illustrates an example of recording configuration information to a distributed ledger, in accordance with some embodiments.

As shown in FIG. 4, a MEC operator system may configure one or more MECs, with which the MEC operator system is associated, based on the configuration information for that MEC operator system. For example, as shown, MEC operator node 103-1 (or some other suitable device or system associated with a particular MEC operator system) may receive (at 412) an application installation package (e.g., a file, a set of files, a container, etc.). The application installation package may be received from application provider client 201 and/or some other device or system associated with a particular application provider, from an application "store" or other repository, and/or from some other suitable source.

MEC operator node 103-1 and/or one or more other devices or systems associated with the MEC provider may configure (at 414) one or more MECs 401 with which the MEC provider is associated, based on MEC configuration information, such as MEC configuration information identified (e.g., at 308) from ledger 101 and/or maintained in off-chain repository 105-1. Configuring (at 414) the one or more MECs 401 may include installing or activating the application installation package at some or all of MECs 401. Additionally, or alternatively, configuring the one or more MECs 401 may include allocating particular amounts or proportions MEC resources to providing services associated with the application, as specified by the MEC configuration information. In some embodiments, MEC operator node 103-1 may configure and/or adjust the configuration of MECs 401 on an ongoing basis. In embodiments where the MEC configuration information includes conditions, criteria, etc., MEC operator node 103-1 may adjust the configuration of MECs 401 based on such criteria being met or no longer being met.

MEC operator node 103-1 may further utilize additional information, metrics, models, etc. when configuring MECs 401. For example, MEC operator node 103-1 may receive, from network 403 with which MECs 401 are associated (and/or from some other source), location information for one or more UEs, such as actual or predicted location information (e.g., where such prediction is based on one or more AI/ML models or other types of predictive modeling techniques). MEC operator node 103-1 may additionally or alternatively receive information indicating a likelihood of such UEs accessing a particular application (e.g., based on one or more models). MEC operator node 103-1 may configure one or more MECs 401 that serve locations in which a relatively large demand for a given application is determined (e.g., actual or predicted demand), such as by installing the application package at such MECs 401, allocating additional resources at MECs 401 in order to provide services associated with the application, etc. On the other hand, MEC operator node 103-1 may refrain from installing the application at MECs 401 with relatively low or no demand for the application (e.g., that serve locations at which UEs are not located, at which UEs are not predicted to be located, at which UEs are not predicted to access the application, etc.), may remove or uninstall the application from such MECs 401, may reduce a resource allocation associated with the application at such MECs 401, etc.

MEC operator node 103-1 may further indicate (at 416) the configuration of the one or more MECs 401 to MEC discovery node 107. For example, in some embodiments, MEC operator node 103-1 may provide an indication of which MECs 401 have been configured, such as an indication of resources allocated at particular MECs 401 for a particular application, an indication of which MECs 401 have the application installed, an indication of which MECs 401 do not have the application installed, etc. MEC operator node 103-1 may further provide, in some embodiments, identifiers or other attributes of such MECs 401 that have been configured. Such identifiers may include a MEC identifier, an Internet Protocol ("IP") address, or other suitable identifiers of MECs 401. In some embodiments, MEC operator node 103-1 may provide (e.g., at 416 and/or at some other time) location information associated with respective MECs 401.

MEC discovery node 107 may record (at 418) the provided MEC configuration information to ledger 101. For example, records 405-1 and 405-2 may reflect respective MEC configurations (e.g., of MECs 401) associated with a particular MEC operator system. Record 405-1 may indicate, for example, an application identifier (e.g., "App_A"), an indication of QoS information (e.g., 20 ms maximum latency), and configuration information of MECs 401 for the particular application (e.g., "Config_A"). In some embodiments, records 405-1 and 405-2 may be recorded to ledger 101 with permissions and/or restrictions indicating that only MEC operator node 103-1 (e.g., the particular MEC operator node 103 from which the information was received) is able to access records 405-1 and 405-2. In this manner, the actual MEC configuration information associated with MEC operator node 103-1 may be private with respect to other MEC operator nodes 103 that communicate with MEC discovery node 107.

In situations where MEC operator node 103-1 updates the configuration of MECs 401 over time, MEC operator node 103-1 may provide (at 416) updated MEC configuration information to MEC discovery node 107, which may accordingly record (at 418) such updated information to ledger 101. The updated information may be used by MEC discovery node 107 when responding to edge discovery requests from UEs, such as UEs that are attempting to access the particular application.

Figure 5:
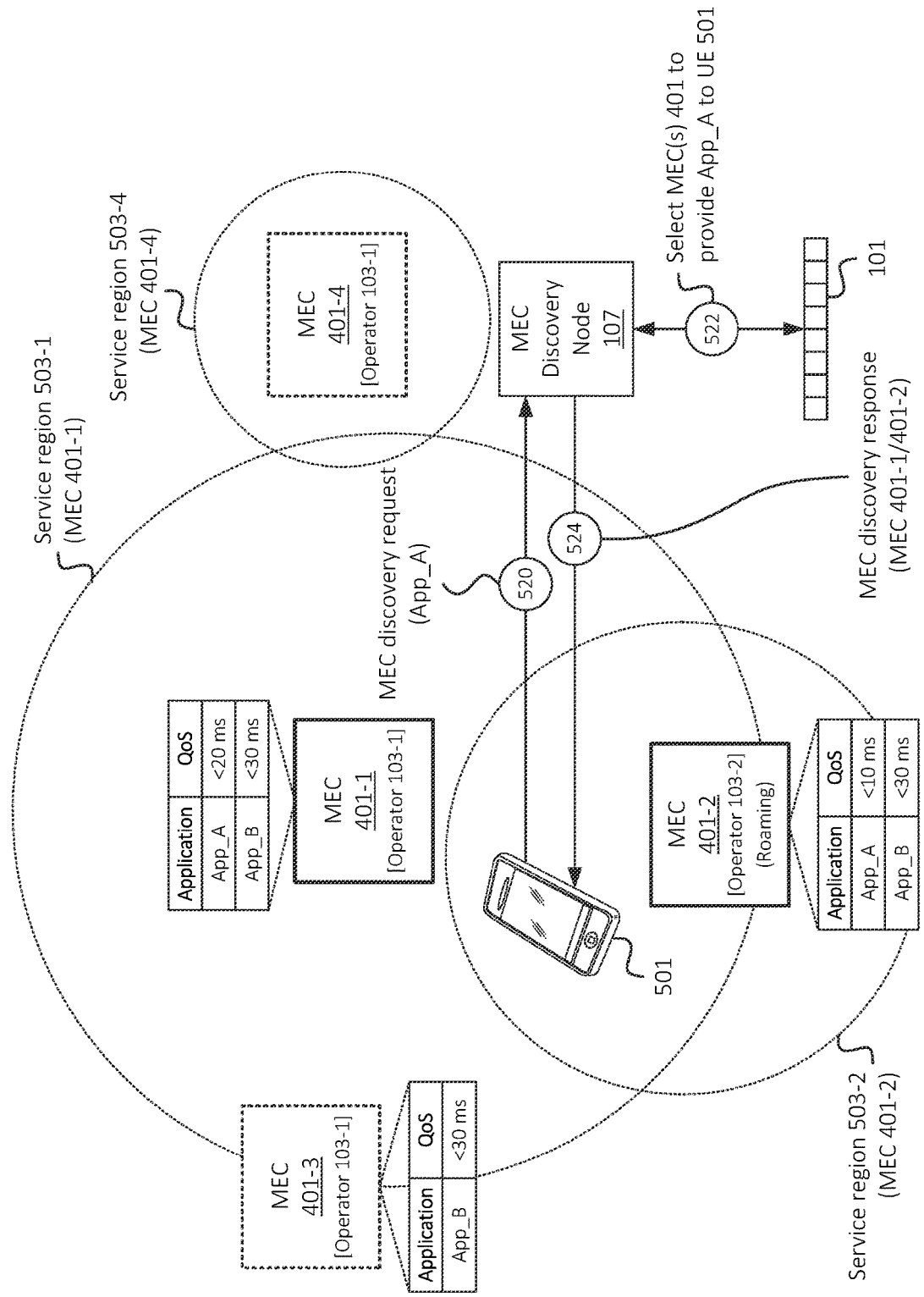
FIG. 5 illustrates an example discovery procedure, in accordance with some embodiments.

As shown in FIG. 5, for example, a particular UE 501 may output (at 520) a MEC discovery request to MEC discovery node 107. For example, UE 501 may communicate via an API or other suitable communication pathway. Additionally, or alternatively, some other device or system (e.g., in addition to or in lieu of UE 501) may output (at 520) the MEC discovery request. The MEC discovery request may indicate that UE 501 is attempting to access, or receive services associated with, a particular application (i.e., "App_A" in this example). In some embodiments, the MEC discovery request may include a geographical location of UE 501, and/or MEC discovery node 107 may determine the geographical location of UE 501 in some other suitable manner (e.g., may receive location information from a wireless network associated with UE 501 or some other device or system that tracks or determines the location of UE 501).

As further shown, UE 501 may be located within service regions 503-1 and 503-2, which are associated with MECs 401-1 and 401-2, respectively. Service regions 503 may refer to respective geographical regions in which particular MECs 401 provide service to UEs 501 that are located within such geographical regions. Specifically, in some embodiments, service regions 503 may refer to respective geographical regions in which particular QoS parameters may be met. For example, service region 503-1 may be a geographical region in which MEC 401-1 is able to provide services associated with App_A with less than 20 ms of latency, and services associated with App_B with less than 30 ms of latency.

In the examples discussed herein, it is assumed that each MEC 401 is associated with one respective service region 503. In some embodiments, MECs 401 may be associated with multiple service regions, in which different levels of performance or QoS may be provided. For example, MEC 401-1 may be associated with a relatively larger service region (e.g., a service region in addition to service region 503-1, which may overlap or encompass some or all of service region 503-1) in which MEC 401-1 is able to provide services associated with App_A with less than 50 ms of latency. The different levels of QoS that may be provided within different (e.g., overlapping) service regions 503 may be due to differing radio channel conditions (e.g., signal strength, interference, propagation delay, etc.) or other factors.

MECs 401-1, 401-3, and 401-4 may be associated with a first MEC operator system (e.g., a MEC operator system associated with MEC operator node 103-1), and MEC 401-2 may be associated with a second MEC operator system (e.g., a MEC operator system associated with MEC operator node 103-2). In this example, assume that UE 501 is associated with the MEC operator system associated with MEC operator node 103-1. For example, such MEC operator system and UE 501 may be associated with the same wireless network provider, carrier, etc. As such, MEC 401-1 may be a "home" or "non-roaming" MEC with respect to UE 501, while MEC 401-2 may be a "roaming" MEC with respect to UE 501.

When outputting (at 520) the discovery request, UE 501 may indicate a particular MEC operator system with which UE 501 is associated. Additionally, or alternatively, UE 501 may indicate one or more MEC operator systems that UE 501 is authorized to access, which may be based on a roaming agreement or partnership between multiple MEC operator systems and/or based on a user preference or other parameters associated with UE 501. Additionally, or alternatively, UE 501 may indicate one or more MEC operator systems that UE 501 that is not authorized to access. In some embodiments, MEC discovery node 107 may determine the MEC operator systems that UE 501 is authorized to access by receiving information from some other source. In this example, assume that UE 501 is authorized to access MECs 401 associated with MEC operator systems that are associated with MEC operator nodes 103-1 and 103-2.

MEC discovery node 107 may select (at 522) one or more MECs 401 based on the MEC discovery request. For example, MEC discovery node 107 may access ledger 101 to identify MECs 401 that are able to provide service associated with the requested application to UE 501. For example, ledger 101 may include records reflecting that App_A is available (e.g., has been installed, or is able to be installed) at MECs 401-1 and 401-2. Such records may further indicate that App_A is available from MEC 401-1 with less than 20 ms of latency within service region 503-1 (e.g., in which UE 501 is located), and that App_A is available from MEC 401-2 with less than 10 ms of latency within service region 503-2, in which UE 501 is also located.

MEC discovery node 107 may further identify (at 107) that MEC 401-3, which is also associated with the "home" or "non-roaming" MEC operator system associated with UE 501, does not have App_A installed or is otherwise not configured to provide App_A, based on the configuration (at 414) of MECs 401. As such, MEC discovery node 107 may determine that MEC 401-3 is not a candidate to provide services associated with App_A to UE 501, regardless of whether UE 501 is located within a service region 503 associated with MEC 401-3.

MEC discovery node 107 may additionally identify that MEC 401-4, which is also associated with the "home" or "non-roaming" MEC operator system associated with UE 501, is associated with service region 503-4, in which UE 501 is not located. As such, MEC discovery node 107 may determine that MEC 401-4 is not a candidate to provide services associated with App_A to UE 501, regardless of whether MEC 401-4 is able to provide App_A to UEs located within service region 503-4.

In some embodiments, MEC discovery node 107 may select a particular eligible MEC 401-1 or 401-2. For example, MEC discovery node 107 may select MEC 401-2 based on the higher level of QoS provided by MEC 401-2 (e.g., lower than 10 ms of latency, versus lower than 20 ms of latency provided by MEC 401-1). Additionally, or alternatively, MEC discovery node 107 may select MEC 401-1 based on MEC 401-1 being a "home" or "non-roaming" MEC with respect to UE 501, even though MEC 401-2 may provide better performance. In some embodiments, MEC discovery node 107 may generate a list (e.g., a ranked list) of candidate MECs based on the MEC discovery request, which may include both MECs 401-1 and 401-2. Such list may indicate, for example, that MEC 401-1 is a "home" or "non-roaming" MEC and/or that MEC 401-2 is a "roaming" MEC with respect to UE 501. The list may indicate the respective QoS information associated with MECs 401-1 and 401-2. UE 501 may accordingly select from the list, and/or may communicate with some other device or system that selects a particular MEC 401 from the list based on the information provided.

MEC discovery node 107 may respond (at 524) to the MEC discovery request with a response indicating the selected MEC(s) 401. For example, MEC discovery node 107 may provide an identifier, IP address, or other information associated with the selected MEC(s) 401, such as MEC 401-1, MEC 401-2, or both. UE 501 may accordingly establish communications with a particular MEC 401 indicated in the response. In instances where the response indicates multiple MECs 401, UE 501 may select a particular MEC 401 based on any suitable criteria or selection methodology, such as the particular MEC 401 providing the lowest latency, a "non-roaming" MEC 401 (e.g., MEC 401-1), a user-selected MEC 401 (e.g., UE 501 may present a pop-up or other type of notification prompting a user of UE 501 to select a particular MEC 401), and/or some other suitable selection methodology. In this manner, MECs 401 associated with multiple different MEC operator systems may be able to be accessed by UEs 501, without necessitating the coordination of configuring MECs 401 associated with different MEC providers.

Figure 6:
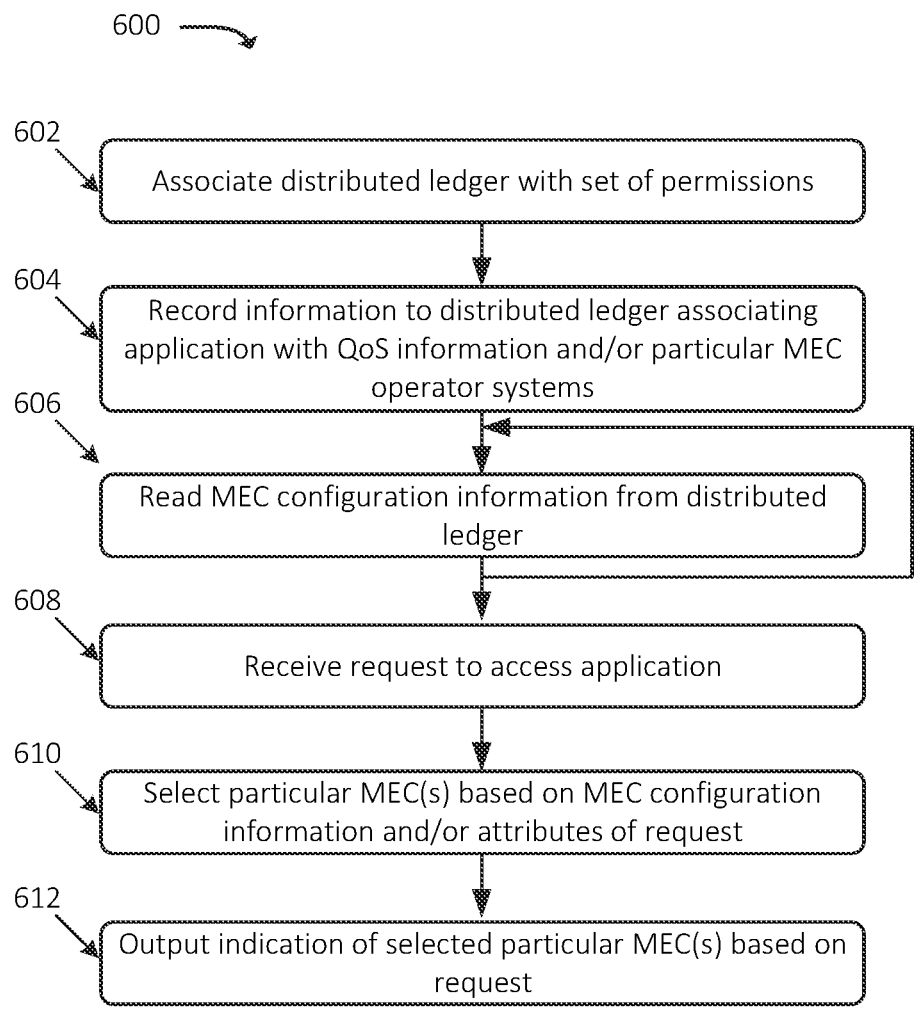
FIG. 6 illustrates an example process for using one or more distributed ledgers to maintain configuration information associated with one or more systems or operators and to facilitate a discovery procedure, in accordance with some embodiments.

FIG. 6 illustrates an example process 600 for using one or more distributed ledgers to maintain configuration information associated with one or more systems or operators and to facilitate a discovery procedure, in accordance with some embodiments. In some embodiments, some or all of process 600 may be performed by MEC discovery node 107. In some embodiments, one or more other devices may perform some or all of process 600 in concert with, and/or in lieu of, MEC discovery node 107, such as by one or more MEC operator nodes 103.

As shown, process 600 may include associating (at 602) a distributed ledger with a set of permissions, including permissions for one or more MEC operator nodes and a MEC discovery node. For example, as discussed above, one or more MEC operator nodes 103 may establish one or more ledgers 101 using any suitable consensus mechanisms and/or ledger creation techniques. In some embodiments, MEC operator nodes 103 and/or one or more other devices or systems may utilize a hyper ledger framework or some other type of ledger management framework in order to establish ledger 101. In some embodiments, ledger 101 may be or may include a permissioned ledger, in which MEC operator nodes 103 and MEC discovery node 107 are authorized to access (e.g., read and/or write to) ledger 101, and/or to read certain portions of ledger 101.

In some embodiments, MEC discovery node 107 may be, may include, or may be communicatively coupled to a dApp or other type of entity that is able to write to ledger 101, interact with smart contracts deployed to ledger 101, and/or perform other operations with respect to ledger 101. In some embodiments, each MEC operator node 103 may be associated with a respective MEC operator system, where different MEC operator systems manage, provide, configure, etc. a respective set of MECs 401. Each MEC operator system may be, may include, and/or may be associated with a respective wireless network provider. For example, MECs 401 may be communicatively coupled to base stations or other components of RANs or other types of wireless networks provided by such wireless network providers.

Process 600 may further include recording (at 604) information to the distributed ledger, associating a particular application with QoS information and/or particular MEC operator systems. For example, MEC discovery node 107 may receive the information regarding a particular application from a particular application provider client 201 with which the application is associated. As discussed above, the QoS information may include performance thresholds, SLAs, or the like. In some embodiments, the QoS information may be provided on a per-operator basis, such as in situations where different MEC operator systems are associated with different performance thresholds for the application.

As discussed above, one or more MEC operator systems may configure one or more associated MECs 401 based on the provided QoS information. For example, MEC operator nodes 103 associated with respective MEC operator systems may access the QoS information recorded to ledger 101, and may identify which QoS information is associated with the respective MEC operator systems. The MEC operator systems may generate MEC configuration information and/or may implement such MEC configuration information, which may include installing the application at one or more MECs 401, allocating resources of MECs 401 to provide the application, configuring routing parameters such that traffic associated with the application is routed to one or more MECs 401, or other suitable operations. MEC operator nodes 103 may accordingly record the implemented configuration parameters to ledger 101.

Process 600 may additionally include reading (at 606) MEC configuration information from the distributed ledger, as provided by one or more MEC operator systems that have configured one or more MECs 401 based on the QoS information for the application. For example, MEC discovery node 107 may access ledger 101 to identify the MEC configuration information provided by one or more MEC operator nodes 103.

In some embodiments, MEC discovery node 107 or some other device or system may maintain a "world state" that maintains up-to-date MEC configuration information. For example, in situations where the MEC configuration for a given MEC operator system changes (e.g., based on updates to the MEC configuration by the MEC operator system), MEC discovery node 107 may update the world state to reflect the updated MEC configuration information (e.g., which may replace some or all of the previous MEC configuration information in the world state for that MEC operator system). In this manner, while ledger 101 may maintain a record of multiple or all instances of MEC configuration information for a given MEC operator system, the world state may include only the most up-to-date MEC configuration information for the given MEC operator system.

MEC discovery node 107 may read or identify (at 606) MEC configuration information associated with multiple MEC operator systems, as recorded to ledger 101 by respective MEC operator nodes 103 associated with such MEC operator systems. In this manner, MEC discovery node 107 may maintain an inter-operator world state, indicating MEC configuration information associated with multiple distinct, independent sets of MECs 401 that are associated with different MEC operator systems that are configured independently.

Process 600 may also include receiving (at 608) a request to access the application. For example, MEC discovery node

107 may receive a request from UE 501 or some other device or system that is communicatively coupled to UE 501. The request may include a request to access the application, and/or may include a request for an identification of one or more MECs 401 via which UE 501 can access the application. In some embodiments, the request may include an identifier of UE 501, a location of UE 501, and/or some other suitable information regarding UE 501.

Process 600 may further include selecting (at 610) one or more MECs 401 based on the MEC configuration information and/or attributes of the request. For example, as discussed above, MEC discovery node 107 may identify a geographically closest MEC 401, from which the application is available with at least a threshold measure of QoS (e.g., as recorded at 604), to the location of UE 501. Additionally, or alternatively, MEC discovery node 107 may identify a particular MEC 401 associated with a particular MEC operator system, such as a MEC operator system that is associated with a wireless network provider with which UE 501 is associated. In some embodiments, MEC discovery node 107 may select multiple MECs 401 based on any suitable criteria, which may include MECs 401 associated with different MEC operator systems.

Process 600 may additionally include outputting (at 612) an indication of the selected particular MEC(s) 401 based on the request. For example, MEC discovery node 107 may respond to the request with an identifier, an IP address, or the like of the one or more selected MEC(s) 401. UE 501 may accordingly communicate with a particular MEC 401 (e.g., one of the selected MECs 401) to receive service associated with the particular application from the particular MEC 401.

Figure 7:
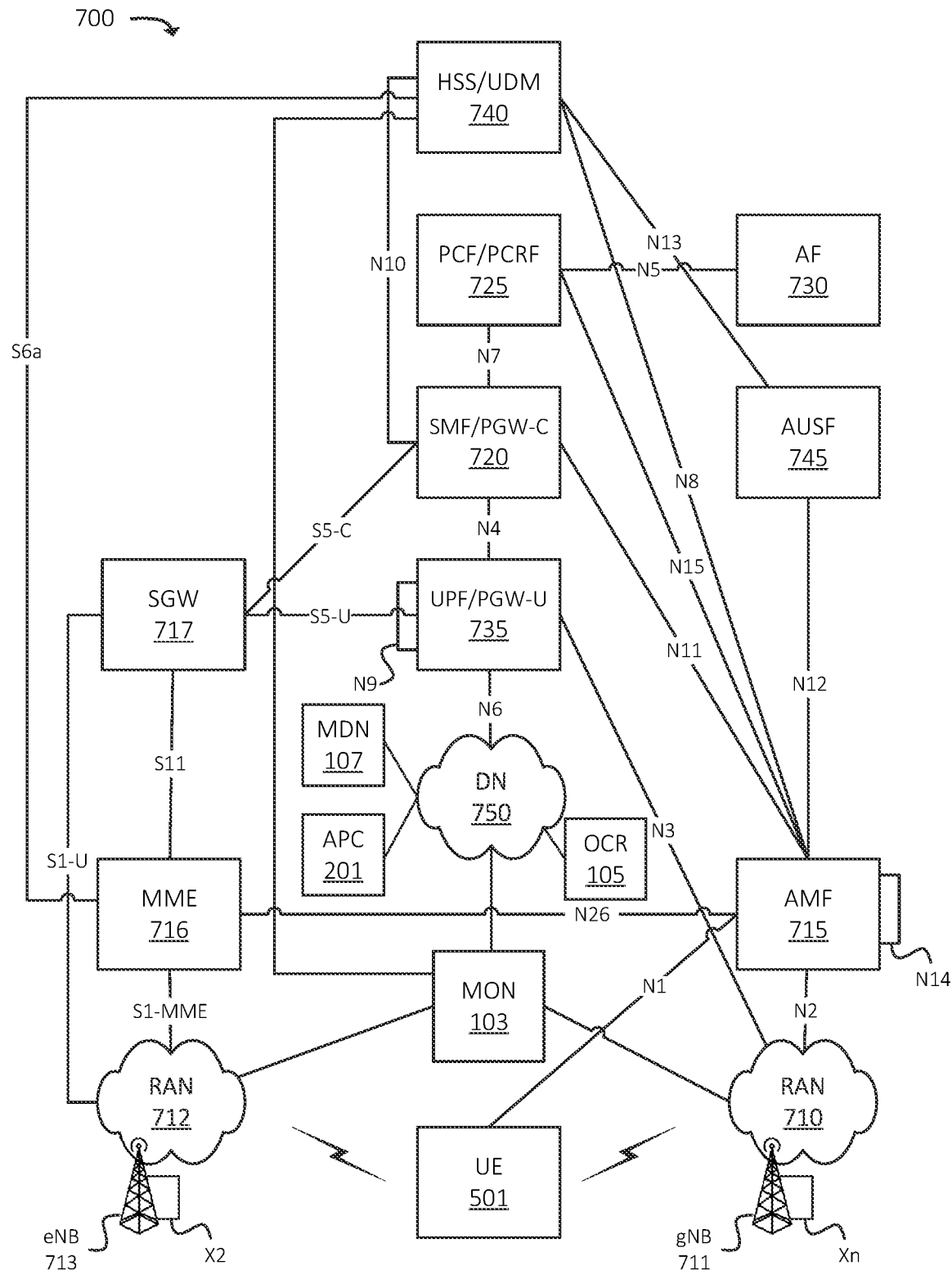
FIG. 7 illustrates an example environment in which one or more embodiments, described herein, may be implemented.

FIG. 7 illustrates an example environment 700, in which one or more embodiments may be implemented. In some embodiments, environment 700 may correspond to a Fifth Generation ("5G") network, and/or may include elements of a 5G network. In some embodiments, environment 700 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 700 may include UE 501, RAN 710 (which may include one or more Next Generation Node Bs ("gNBs") 711), RAN 712 (which may include one or more evolved Node Bs ("eNBs") 713), and various network functions such as Access and Mobility Management Function ("AMF") 715, Mobility Management Entity ("MME") 716, Serving Gateway ("SGW") 717, Session Management Function ("SMF")/Packet Data Network ("PDN") Gateway ("PGW")-Control plane function ("PGW-C") 720, Policy Control Function ("PCF")/Policy Charging and Rules Function ("PCRF") 725, Application Function ("AF") 730, User Plane Function ("UPF")/PGW-User plane function ("PGW-U") 735, Home Subscriber Server ("HSS")/Unified Data Management ("UDM") 740, and Authentication Server Function ("AUSF") 745. Environment 700 may also include one or more networks, such as Data Network ("DN") 750. Environment 700 may include one or more additional devices or systems communicatively coupled to one or more networks (e.g., DN 750), such as MEC operator node 103, MEC discovery node 107, and/or application provider client 201.

In some embodiments, some or all of environment 700 may be or may include a network associated with a particular wireless network provider, which may be associated with a particular MEC operator. As such, different instances of environment 700 and/or portions or variations thereof may be associated with different wireless network providers and/or different MEC providers. In such scenarios, MEC operator nodes 103 associated with different MEC operators may communicate with MEC discovery node 107 and/or other devices or systems via the Internet or one or more other suitable networks.

The example shown in FIG. 7 illustrates one instance of each network component or function (e.g., one instance of SMF/PGW-C 720, PCF/PCRF 725, UPF/PGW-U 735, HSS/UDM 740, and/or AUSF 745). In practice, environment 700 may include multiple instances of such components or functions. For example, in some embodiments, environment 700 may include multiple "slices" of a core network, where each slice includes a discrete set of network functions (e.g., one slice may include a first instance of SMF/PGW-C 720, PCF/PCRF 725, UPF/PGW-U 735, HSS/UDM 740, and/or AUSF 745, while another slice may include a second instance of SMF/PGW-C 720, PCF/PCRF 725, UPF/PGW-U 735, HSS/UDM 740, and/or AUSF 745). The different slices may provide differentiated levels of service, such as service in accordance with different Quality of Service ("QoS") parameters.

The quantity of devices and/or networks, illustrated in FIG. 7, is provided for explanatory purposes only. In practice, environment 700 may include additional devices and/or networks, fewer devices and/or networks, different devices and/or networks, or differently arranged devices and/or networks than illustrated in FIG. 7. For example, while not shown, environment 700 may include devices that facilitate or enable communication between various components shown in environment 700, such as routers, modems, gateways, switches, hubs, etc. Alternatively, or additionally, one or more of the devices of environment 700 may perform one or more network functions described as being performed by another one or more of the devices of environment 700. Devices of environment 700 may interconnect with each other and/or other devices via wired connections, wireless connections, or a combination of wired and wireless connections. In some implementations, one or more devices of environment 700 may be physically integrated in, and/or may be physically attached to, one or more other devices of environment 700.

UE 501 may include a computation and communication device, such as a wireless mobile communication device that is capable of communicating with RAN 710, RAN 712, and/or DN 750. UE 501 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), or another type of mobile computation and communication device. UE 501 may send traffic to and/or receive traffic (e.g., user plane traffic) from DN 750 via RAN 710, RAN 712, and/or UPF/PGW-U 735. In some embodiments, MEC operator nodes 103, MEC discovery node 107, and/or one or more other devices or systems discussed herein may be, may include, or may be implemented by one or more UEs 501.

RAN 710 may be, or may include, a 5G RAN that includes one or more base stations (e.g., one or more gNBs 711), via which UE 501 may communicate with one or more other elements of environment 700. UE 501 may communicate with RAN 710 via an air interface (e.g., as provided by gNB 711). For instance, RAN 710 may receive traffic (e.g., voice call traffic, data traffic, messaging traffic, signaling traffic, etc.) from UE 501 via the air interface, and may communicate the traffic to UPF/PGW-U 735, and/or one or more other devices or networks. Similarly, RAN 710 may receive traffic intended for UE 501 (e.g., from UPF/PGW-U 735, AMF 715, and/or one or more other devices or networks) and may communicate the traffic to UE 501 via the air interface.

RAN 712 may be, or may include, a LTE RAN that includes one or more base stations (e.g., one or more eNBs 713), via which UE 501 may communicate with one or more other elements of environment 700. UE 501 may communicate with RAN 712 via an air interface (e.g., as provided by eNB 713). For instance, RAN 710 may receive traffic (e.g., voice call traffic, data traffic, messaging traffic, signaling traffic, etc.) from UE 501 via the air interface, and may communicate the traffic to UPF/PGW-U 735, and/or one or more other devices or networks. Similarly, RAN 710 may receive traffic intended for UE 501 (e.g., from UPF/PGW-U 735, SGW 717, and/or one or more other devices or networks) and may communicate the traffic to UE 501 via the air interface.

AMF 715 may include one or more devices, systems, Virtualized Network Functions ("VNFs"), Cloud-Native Network Functions ("CNFs"), etc., that perform operations to register UE 501 with the 5G network, to establish bearer channels associated with a session with UE 501, to hand off UE 501 from the 5G network to another network, to hand off UE 501 from the other network to the 5G network, manage mobility of UE 501 between RANs 710 and/or gNBs 711, and/or to perform other operations. In some embodiments, the 5G network may include multiple AMFs 715, which communicate with each other via the N14 interface (denoted in FIG. 7 by the line marked "N14" originating and terminating at AMF 715).

MME 716 may include one or more devices, systems, VNFs, CNFs, etc., that perform operations to register UE 501 with the EPC, to establish bearer channels associated with a session with UE 501, to hand off UE 501 from the EPC to another network, to hand off UE 501 from another network to the EPC, manage mobility of UE 501 between RANs 712 and/or eNBs 713, and/or to perform other operations.

SGW 717 may include one or more devices, systems, VNFs, CNFs, etc., that aggregate traffic received from one or more eNBs 713 and send the aggregated traffic to an external network or device via UPF/PGW-U 735. Additionally, SGW 717 may aggregate traffic received from one or more UPF/PGW-Us 735 and may send the aggregated traffic to one or more eNBs 713. SGW 717 may operate as an anchor for the user plane during inter-eNB handovers and as an anchor for mobility between different telecommunication networks or RANs (e.g., RANs 710 and 712).

SMF/PGW-C 720 may include one or more devices, systems, VNFs, CNFs, etc., that gather, process, store, and/or provide information in a manner described herein. SMF/PGW-C 720 may, for example, facilitate the establishment of communication sessions on behalf of UE 501. In some embodiments, the establishment of communications sessions may be performed in accordance with one or more policies provided by PCF/PCRF 725.

PCF/PCRF 725 may include one or more devices, systems, VNFs, CNFs, etc., that aggregate information to and from the 5G network and/or other sources. PCF/PCRF 725 may receive information regarding policies and/or subscriptions from one or more sources, such as subscriber databases and/or from one or more users (such as, for example, an administrator associated with PCF/PCRF 725).

AF 730 may include one or more devices, systems, VNFs, CNFs, etc., that receive, store, and/or provide information that may be used in determining parameters (e.g., quality of service parameters, charging parameters, or the like) for certain applications.

UPF/PGW-U 735 may include one or more devices, systems, VNFs, CNFs, etc., that receive, store, and/or provide data (e.g., user plane data). For example, UPF/PGW-U 735 may receive user plane data (e.g., voice call traffic, data traffic, etc.), destined for UE 501, from DN 750, and may forward the user plane data toward UE 501 (e.g., via RAN 710, SMF/PGW-C 720, and/or one or more other devices). In some embodiments, multiple UPFs 735 may be deployed (e.g., in different geographical locations), and the delivery of content to UE 501 may be coordinated via the N9 interface (e.g., as denoted in FIG. 7 by the line marked "N9" originating and terminating at UPF/PGW-U 735). Similarly, UPF/PGW-U 735 may receive traffic from UE 501 (e.g., via RAN 710, SMF/PGW-C 720, and/or one or more other devices), and may forward the traffic toward DN 750. In some embodiments, UPF/PGW-U 735 may communicate (e.g., via the N4 interface) with SMF/PGW-C 720, regarding user plane data processed by UPF/PGW-U 735.

HSS/UDM 740 and AUSF 745 may include one or more devices, systems, VNFs, CNFs, etc., that manage, update, and/or store, in one or more memory devices associated with AUSF 745 and/or HSS/UDM 740, profile information associated with a subscriber. AUSF 745 and/or HSS/UDM 740 may perform authentication, authorization, and/or accounting operations associated with the subscriber and/or a communication session with UE 501.

DN 750 may include one or more wired and/or wireless networks. For example, DN 750 may include an Internet Protocol ("IP")-based PDN, a wide area network ("WAN") such as the Internet, a private enterprise network, and/or one or more other networks. UE 501 may communicate, through DN 750, with data servers, other UEs 501, and/or to other servers or applications that are coupled to DN 750. DN 750 may be connected to one or more other networks, such as a public switched telephone network ("PSTN"), a public land mobile network ("PLMN"), and/or another network. DN 750 may be connected to one or more devices, such as content providers, applications, web servers, and/or other devices, with which UE 501 may communicate.

Figure 8:
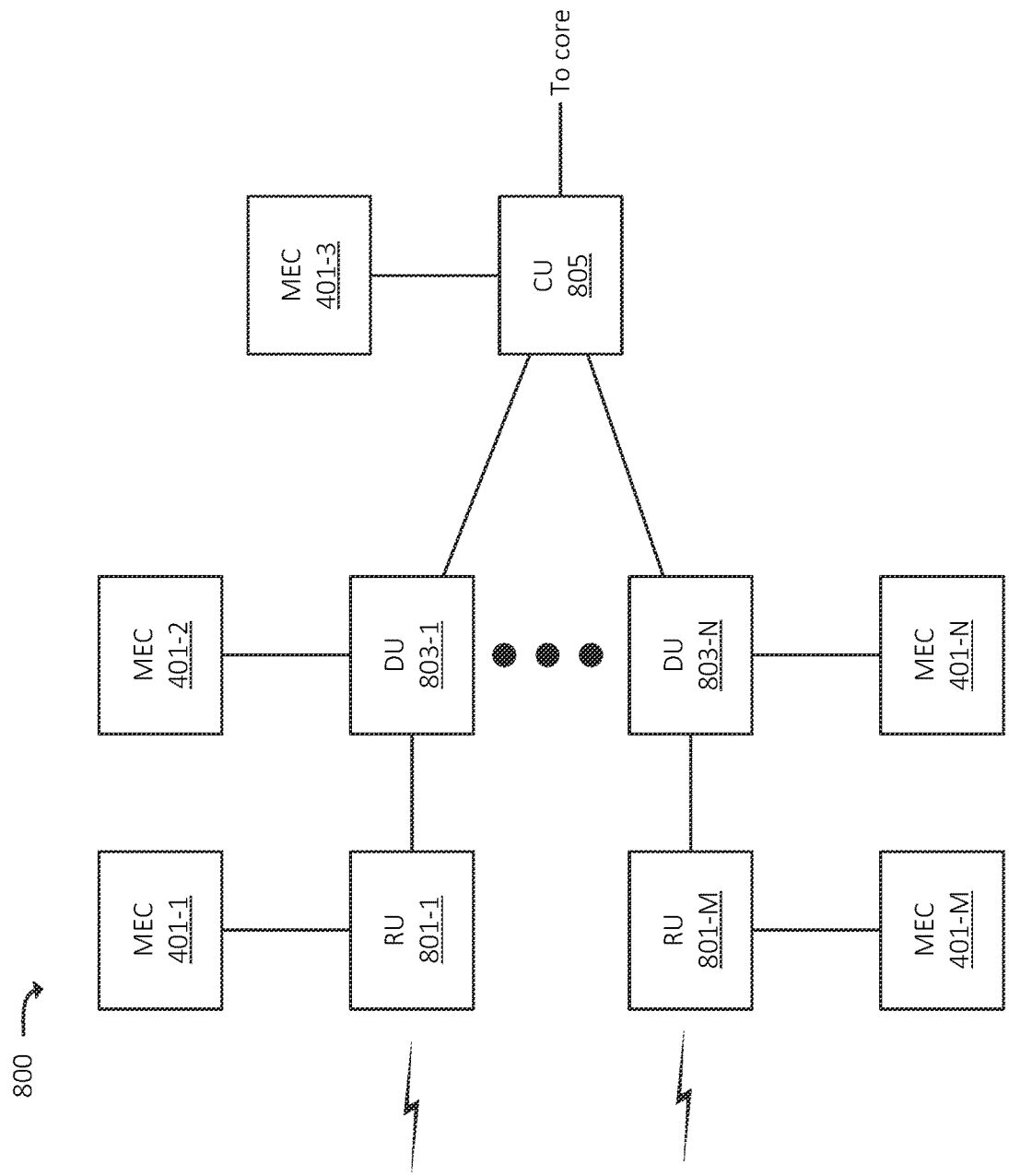
FIG. 8 illustrates an example arrangement of a radio access network ("RAN"), in accordance with some embodiments.

FIG. 8 illustrates an example Distributed Unit ("DU") network 800, which may be included in and/or implemented by one or more RANs (e.g., RAN 710, RAN 712, or some other RAN). In some embodiments, a particular RAN may include one DU network 800. In some embodiments, a particular RAN may include multiple DU networks 800. In some embodiments, DU network 800 may correspond to a particular gNB 711 of a 5G RAN (e.g., RAN 710). In some embodiments, DU network 800 may correspond to multiple gNBs 711. In some embodiments, DU network 800 may correspond to one or more other types of base stations of one or more other types of RANs. As shown, DU network 800 may include Central Unit ("CU") 805, one or more Distributed Units ("DUs") 803-1 through 803-N (referred to individually as "DU 803," or collectively as "DUs 803"), and one or more Radio Units ("RUs") 801-1 through 801-M (referred to individually as "RU 801," or collectively as "RUs 801").

CU 805 may communicate with a core of a wireless network (e.g., may communicate with one or more of the devices or systems described above with respect to FIG. 7, such as AMF 715 and/or UPF/PGW-U 735). In the uplink direction (e.g., for traffic from UEs 501 to a core network), CU 805 may aggregate traffic from DUs 803, and forward the aggregated traffic to the core network. In some embodiments, CU 805 may receive traffic according to a given protocol (e.g., Radio Link Control ("RLC")) from DUs 803, and may perform higher-layer processing (e.g., may aggregate/process RLC packets and generate Packet Data Convergence Protocol ("PDCP") packets based on the RLC packets) on the traffic received from DUs 803.

In accordance with some embodiments, CU 805 may receive downlink traffic (e.g., traffic from the core network) for a particular UE 501, and may determine which DU(s) 803 should receive the downlink traffic. DU 803 may include one or more devices that transmit traffic between a core network (e.g., via CU 805) and UE 501 (e.g., via a respective RU 801). DU 803 may, for example, receive traffic from RU 801 at a first layer (e.g., physical ("PHY") layer traffic, or lower PHY layer traffic), and may process/aggregate the traffic to a second layer (e.g., upper PHY and/or RLC). DU 803 may receive traffic from CU 805 at the second layer, may process the traffic to the first layer, and provide the processed traffic to a respective RU 801 for transmission to UE 501.

RU 801 may include hardware circuitry (e.g., one or more RF transceivers, antennas, radios, and/or other suitable hardware) to communicate wirelessly (e.g., via an RF interface) with one or more UEs 501, one or more other DUs 803 (e.g., via RUs 801 associated with DUs 803), and/or any other suitable type of device. In the uplink direction, RU 801 may receive traffic from UE 501 and/or another DU 803 via the RF interface and may provide the traffic to DU 803. In the downlink direction, RU 801 may receive traffic from DU 803, and may provide the traffic to UE 501 and/or another DU 803.

RUs 801 may, in some embodiments, be communicatively coupled to one or more MECs 401. For example, RU 801-1 may be communicatively coupled to MEC 401-1, RU 801-M may be communicatively coupled to MEC 401-M, DU 803-1 may be communicatively coupled to MEC 401-2, DU 803-N may be communicatively coupled to MEC 401-N, CU 805 may be communicatively coupled to MEC 401-3, and so on. MECs 401 may include hardware resources (e.g., configurable or provisionable hardware resources) that may be configured to provide services and/or otherwise process traffic to and/or from UE 501, via a respective RU 801.

For example, RU 801-1 may route some traffic, from UE 501, to MEC 401-1 instead of to a core network (e.g., via DU 803 and CU 805). MEC 401-1 may process the traffic, perform one or more computations based on the received traffic, and may provide traffic to UE 501 via RU 801-1. In this manner, ultra-low latency services may be provided to UE 501, as traffic does not need to traverse DU 803, CU 805, and an intervening backhaul network between DU network 800 and the core network. In some embodiments, MEC 401 may include, and/or may implement, some or all of the functionality described above with respect to ledger 101, UPF 735, and/or one or more other devices, systems, VNFs, CNFs, etc.

Figure 9:
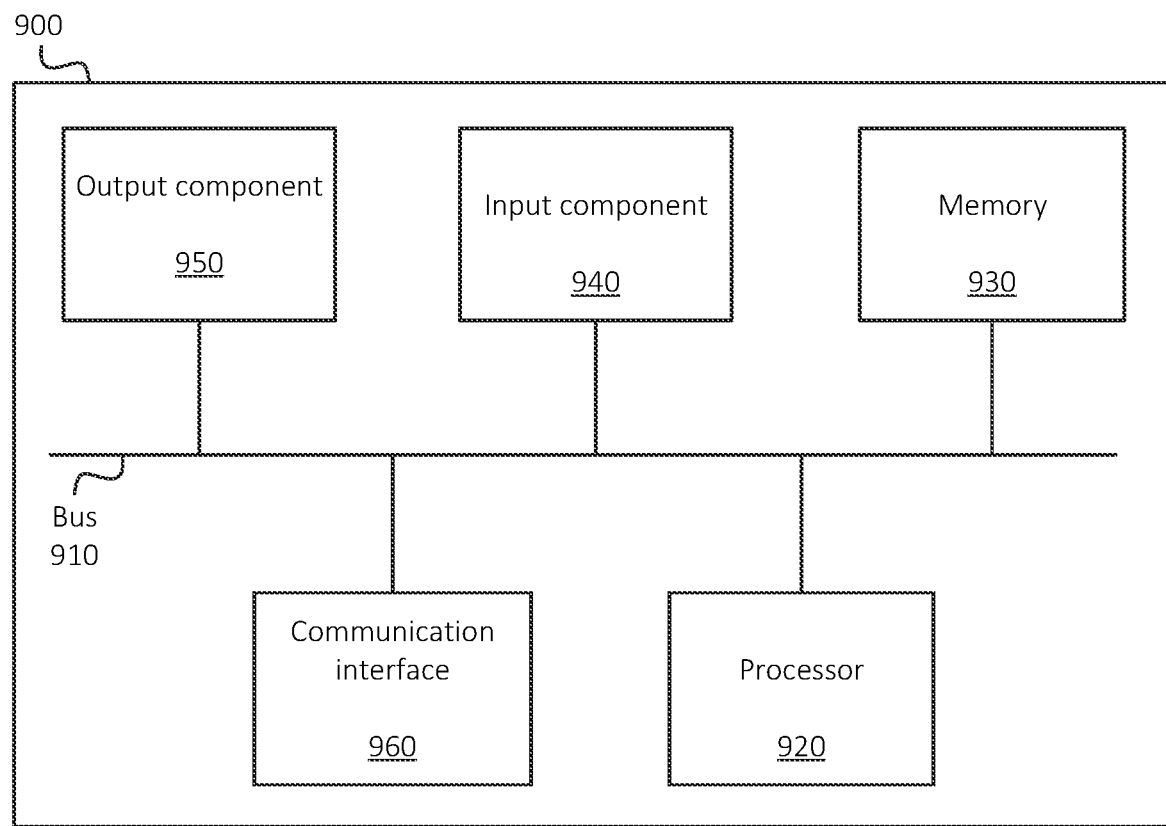
FIG. 9 illustrates example components of one or more devices, in accordance with one or more embodiments described herein.

FIG. 9 illustrates example components of device 900. One or more of the devices described above may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. In some embodiments, processor 920 may be or may include one or more hardware processors. Memory 930 may include any type of dynamic storage device that may store information and instructions for execution by processor 920, and/or any type of non-volatile storage device that may store information for use by processor 920.

Input component 940 may include a mechanism that permits an operator to input information to device 900 and/or other receives or detects input from a source external to 940, such as a touchpad, a touchscreen, a keyboard, a keypad, a button, a switch, a microphone or other audio input component, etc. In some embodiments, input component 940 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-6), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
  one or more processors configured to:
    record, to a distributed ledger, information associating a particular application with a particular set of Quality of Service ("QoS") information,
      wherein a particular Multi-Access/Mobile Edge Computing ("MEC") device operator system accesses the distributed ledger to identify the information associating the particular application with the particular set of QoS information;
    read, from the distributed ledger, MEC configuration information indicating that the MEC device operator system has configured one or more MEC devices, of a plurality of MEC devices associated with the MEC device operator system, to provide the particular application in accordance with the particular set of QoS information;
    receive a request to access the particular application;
    select a particular MEC device, from the plurality of MEC devices, based on the request and further based on the MEC configuration information; and
    output, based on the request, an indication of the selected particular MEC device.

2. The device of claim 1, wherein the particular set of QoS information includes a threshold maximum latency.

3. The device of claim 1, wherein the one or more MEC devices are each associated with a respective service region in which the one or more MEC devices have been configured to provide the particular application in accordance with the particular set of QoS information, wherein the MEC configuration information includes respective service region associated with each of the one or more MEC devices.

4. The device of claim 3, wherein the request is associated with a particular User Equipment ("UE"), wherein selecting the particular MEC device from the plurality of MEC devices further includes selecting the particular MEC device based on a location of the UE and the respective service regions associated with the one or more MEC devices.

5. The device of claim 1, wherein the MEC configuration information includes one or more identifiers of the one or more MEC devices that have been configured to provide the particular application in accordance with the particular set of QoS information, wherein the indication of the selected particular MEC device includes an identifier of the selected particular MEC device.

6. The device of claim 1, wherein the particular MEC device operator system is a first MEC device operator system, wherein the plurality of set of MEC devices are a first plurality of MEC devices, wherein the particular set of QoS information is a first set of QoS information, wherein the one or more processors are further configured to:
  record, to the distributed ledger, information associating the particular application with a second set of QoS information,
    wherein a second MEC device operator system accesses the distributed ledger to identify the information associating the particular application with the second set of QoS information, and
    wherein the distributed ledger system is associated with one or more permissions whereby the information associating the particular application with the second set of QoS information is inaccessible to the first MEC device operator.

7. The device of claim 1, wherein the particular MEC device operator system accesses the distributed ledger to identify the information associating the particular application with the particular set of QoS information via a node that maintains the distributed ledger and is authorized to write to the distributed ledger, and
wherein the particular MEC device operator system provides, via the node, the MEC configuration information to the distributed ledger.

8. A non-transitory computer-readable medium, storing a plurality of processor-executable instructions to:
record, to a distributed ledger, information associating a particular application with a particular set of Quality of Service ("QoS") information,
wherein a particular Multi-Access/Mobile Edge Computing ("MEC") device operator system accesses the distributed ledger to identify the information associating the particular application with the particular set of QoS information;
read, from the distributed ledger, MEC configuration information indicating that the MEC device operator system has configured one or more MEC devices, of a plurality of MEC devices associated with the MEC device operator system, to provide the particular application in accordance with the particular set of QoS information;
receive a request to access the particular application;
select a particular MEC device, from the plurality of MEC devices, based on the request and further based on the MEC configuration information; and
output, based on the request, an indication of the selected particular MEC device.

9. The non-transitory computer-readable medium of claim 8, wherein the particular set of QoS information includes a threshold maximum latency.

10. The non-transitory computer-readable medium of claim 8, wherein the one or more MEC devices are each associated with a respective service region in which the one or more MEC devices have been configured to provide the particular application in accordance with the particular set of QoS information, wherein the MEC configuration information includes respective service region associated with each of the one or more MEC devices.

11. The non-transitory computer-readable medium of claim 10, wherein the request is associated with a particular User Equipment ("UE"), wherein selecting the particular MEC device from the plurality of MEC devices further includes selecting the particular MEC device based on a location of the UE and the respective service regions associated with the one or more MEC devices.

12. The non-transitory computer-readable medium of claim 8, wherein the MEC configuration information includes one or more identifiers of the one or more MEC devices that have been configured to provide the particular application in accordance with the particular set of QoS information, wherein the indication of the selected particular MEC device includes an identifier of the selected particular MEC device.

13. The non-transitory computer-readable medium of claim 8, wherein the particular MEC device operator system is a first MEC device operator system, wherein the plurality of set of MEC devices are a first plurality of MEC devices, wherein the particular set of QoS information is a first set of QoS information, wherein the plurality of processor-executable instructions further include processor-executable instructions to:
record, to the distributed ledger, information associating the particular application with a second set of QoS information,
wherein a second MEC device operator system accesses the distributed ledger to identify the information associating the particular application with the second set of QoS information, and
wherein the distributed ledger system is associated with one or more permissions whereby the information associating the particular application with the second set of QoS information is inaccessible to the first MEC device operator.

14. The non-transitory computer-readable medium of claim 8, wherein the particular MEC device operator system accesses the distributed ledger to identify the information associating the particular application with the particular set of QoS information via a node that maintains the distributed ledger and is authorized to write to the distributed ledger, and
wherein the particular MEC device operator system provides, via the node, the MEC configuration information to the distributed ledger.

15. A method, comprising:
recording, to a distributed ledger, information associating a particular application with a particular set of Quality of Service ("QoS") information,
wherein a particular Multi-Access/Mobile Edge Computing ("MEC") device operator system accesses the distributed ledger to identify the information associating the particular application with the particular set of QoS information;
reading, from the distributed ledger, MEC configuration information indicating that the MEC device operator system has configured one or more MEC devices, of a plurality of MEC devices associated with the MEC device operator system, to provide the particular application in accordance with the particular set of QoS information;
receiving a request to access the particular application;
selecting a particular MEC device, from the plurality of MEC devices, based on the request and further based on the MEC configuration information; and
outputting, based on the request, an indication of the selected particular MEC device.

16. The method of claim 15, wherein the particular set of QoS information includes a threshold maximum latency.

17. The method of claim 15,
wherein the one or more MEC devices are each associated with a respective service region in which the one or more MEC devices have been configured to provide the particular application in accordance with the particular set of QoS information,
wherein the MEC configuration information includes respective service region associated with each of the one or more MEC devices,
wherein the request is associated with a particular User Equipment ("UE"), and
wherein selecting the particular MEC device from the plurality of MEC devices further includes selecting the particular MEC device based on a location of the UE and the respective service regions associated with the one or more MEC devices.

18. The method of claim 15, wherein the MEC configuration information includes one or more identifiers of the one or more MEC devices that have been configured to provide the particular application in accordance with the particular set of QoS information, wherein the indication of the selected particular MEC device includes an identifier of the selected particular MEC device.

19. The method of claim 15, wherein the particular MEC device operator system is a first MEC device operator system, wherein the plurality of set of MEC devices are a first plurality of MEC devices, wherein the particular set of QoS information is a first set of QoS information, the method further comprising:
- recording, to the distributed ledger, information associating the particular application with a second set of QoS information,
    - wherein a second MEC device operator system accesses the distributed ledger to identify the information associating the particular application with the second set of QoS information, and
    - wherein the distributed ledger system is associated with one or more permissions whereby the information associating the particular application with the second set of QoS information is inaccessible to the first MEC device operator.

20. The method of claim 15, wherein the particular MEC device operator system accesses the distributed ledger to identify the information associating the particular application with the particular set of QoS information via a node that maintains the distributed ledger and is authorized to write to the distributed ledger, and
- wherein the particular MEC device operator system provides, via the node, the MEC configuration information to the distributed ledger.

* * * * *